(12) United States Patent
Sato

(10) Patent No.: US 12,019,935 B2
(45) Date of Patent: Jun. 25, 2024

(54) INFORMATION PROCESSING DEVICE AND INFORMATION PROCESSING PROGRAM

(71) Applicant: FUJIFILM CORPORATION, Tokyo (JP)

(72) Inventor: Yusuke Sato, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 18/546,599

(22) PCT Filed: Feb. 14, 2022

(86) PCT No.: PCT/JP2022/005683
§ 371 (c)(1),
(2) Date: Aug. 16, 2023

(87) PCT Pub. No.: WO2022/181376
PCT Pub. Date: Sep. 1, 2022

(65) Prior Publication Data
US 2024/0134586 A1    Apr. 25, 2024

(30) Foreign Application Priority Data
Feb. 24, 2021 (JP) .................. 2021-027672

(51) Int. Cl.
*G06F 3/12* (2006.01)

(52) U.S. Cl.
CPC .......... *G06F 3/1274* (2013.01); *G06F 3/1205* (2013.01); *G06F 3/1273* (2013.01)

(58) Field of Classification Search
USPC ....................................... 358/1.14
See application file for complete search history.

(56) References Cited

U.S. PATENT DOCUMENTS

2018/0217797 A1* 8/2018 Inoue ............... H04N 1/00408
2018/0220015 A1   8/2018 Akuzawa

FOREIGN PATENT DOCUMENTS

JP          2018-125687 A    8/2018

* cited by examiner

*Primary Examiner* — Jacky X Zheng
(74) *Attorney, Agent, or Firm* — SOLARIS Intellectual Property Group, PLLC

(57) ABSTRACT

An information processing unit 20 includes a CPU 21, in which the CPU 21 displays an operator associated with a setting of a job on a display unit 14, and in a case in which the CPU 21 receives a retaining instruction, which is an instruction to retain the operator associated with the setting of the job without erasing the operator from the display unit 14 while the job is being executed, and after the receipt of the retaining instruction, in a case in which the job that is being executed is discontinued, the CPU 21 cancels the retaining instruction for the discontinued job.

8 Claims, 15 Drawing Sheets

FIG.2

JOB HISTORY DATABASE

| FUNCTION | SETTING | | | EXECUTION INSTRUCTION RECEPTION DATE AND TIME | PRESENCE OR ABSENCE OF RETAINING INSTRUCTION | PRESENCE OR ABSENCE OF JOB DISCONTINUATION |
|---|---|---|---|---|---|---|
| | COLOR | DOUBLE-SIDED | ... | | | |
| IMAGE PRINTING | COLOR | DOUBLE-SIDED | ... | 2021/1/6 15:00 | YES | NO |
| | MONOCHROME | DOUBLE-SIDED | ... | 2020/12/3 14:30 | NO | NO |
| | COLOR | SINGLE-SIDED | ... | 2021/1/8 12:00 | YES | YES |
| ... | ... | ... | ... | ... | ... | ... |

INFORMATION PROCESSING DEVICE AND INFORMATION PROCESSING PROGRAM

TECHNICAL FIELD

The present disclosure relates to an information processing device and an information processing program.

BACKGROUND ART

Japanese Patent Application Laid-Open (JP-A) No. 2018-125687 (Patent Literature 1) discloses an image processing device including a storage unit capable of storing histories of a predetermined number of jobs, and a display unit that displays the histories of the jobs stored in the storage unit. The image processing device has a control unit that, in a case in which the history of the predetermined number of jobs is stored in the storage unit, performs control to erase one of the histories of the jobs stored according to job execution and store the history of the started job in the storage unit. The image processing device has a setting unit that performs setting such that the history of the job selected by a user is not erased from the storage unit by the control unit.

SUMMARY OF INVENTION

Technical Problem

For example, in a case in which an operator associated with a setting of a job is displayed on a display unit, there is an information processing device that causes an operator instructed to retain by a user to retain without being erased from the display unit even in a case in which the number of displayed operators exceeds a threshold. However, the information processing device has a problem that, in a case in which the retaining instruction is received while the job is being executed, the corresponding operator is caused to retain on the display unit even in a case in which the job that is being executed is discontinued.

An object of the disclosure is to enable cancellation of the retaining instruction when a job is discontinued in a case in which the retaining instruction is received while the job is being executed.

Solution to Problem

In order to achieve the above object, an information processing device according to a first aspect includes a processor, in which the processor displays an operator associated with a setting of a job on a display unit; receives a retaining instruction, which is an instruction to retain the operator associated with the setting of the job without erasing the operator from the display unit while the job is being executed; and after receiving the retaining instruction, in a case in which the job that is being executed is discontinued, cancels the retaining instruction for the discontinued job.

In an information processing device according to a second aspect, in the information processing device according to the first aspect, the processor displays an operator associated with a setting of the discontinued job on the display unit as a history of the setting of the job in a case in which the retaining instruction is canceled.

In an information processing device according to a third aspect, in the information processing device according to the second aspect, the processor displays the operator associated with the setting of the discontinued job on the display unit until the operator becomes an oldest applied operator in the history and is erased from the history due to limitation of a number of operators displayable on the display unit in a case in which the retaining instruction is canceled.

In an information processing device according to a fourth aspect, in the information processing device according to any one of the first to third aspects, the processor receives a selection as to whether to cancel the retaining instruction in a case in which the job that is being executed is discontinued, and cancels the retaining instruction for the discontinued job in a case in which a selection to cancel the retaining instruction is received.

In an information processing device according to a fifth aspect, in the information processing device according to the fourth aspect, the processor displays the operator associated with the setting of the discontinued job on the display unit identifiably from another operator in a case in which selection not to cancel the retaining instruction is received.

In an information processing device according to a sixth aspect, in the information processing device according to any one of the first to fifth aspects, the processor does not apply the setting associated with the operator for which the retaining instruction has been given to another job even in a case in which the user operates the operator for which the retaining instruction has been given while a job based on the setting associated with the operator for which the retaining instruction has been given is being executed, even in a case in which the retaining instruction is received.

In an information processing device according to a seventh aspect, in the information processing device according to any one of the first to sixth aspects, the processor receives renaming of the operator associated with the setting of the job that is being executed in a case in which the retaining instruction is received while the job is being executed, and returns, after the receipt of the renaming, in a case in which the job that is being executed is discontinued, the renaming for the discontinued job to an original state.

Furthermore, in order to achieve the above object, an information processing program according to an eighth aspect causes a computer to execute a process, the process including: displaying an operator associated with a setting of a job on a display unit; receiving a retaining instruction, which is an instruction to retain the operator associated with the setting of the job without erasing the operator from the display unit while the job is being executed; and canceling, after the receipt of the retaining instruction, in a case in which the job that is being executed is discontinued, the retaining instruction for the discontinued job.

Advantageous Effects of Invention

According to the first aspect and the eighth aspect, in a case in which the retaining instruction is received while the job is being executed, and the job is discontinued, the retaining instruction can be canceled.

According to the second aspect, it is possible to suppress erasing of the operator associated with the setting of the discontinued job from the display unit.

According to the third aspect, it is possible to suppress erasing of the operator from the display unit until the operator associated with the setting of the discontinued job becomes the oldest applied operator and is erased due to the limitation of the number of displayable operators.

According to the fourth aspect, in a case in which the job that is being executed is discontinued, the user can select whether to cancel the retaining instruction.

According to the fifth aspect, in a case in which the user selects not to cancel the retaining instruction when the job that is being executed is discontinued, the operator associated with the setting of the discontinued job can be identifiably specified from another operator.

According to the sixth aspect, while the job based on the setting associated with the operator for which the retaining instruction has been given is being executed, the setting can be prevented from being applied to another job.

According to the seventh aspect, in a case in which the job is discontinued after the receipt of the renaming of the operator associated with the setting of the job that is being executed, the renaming can be returned to the original state.

BRIEF DESCRIPTION OF DRAWINGS

FIG. 2 is a schematic diagram illustrating an example of a configuration of a job history database according to the embodiment.

DESCRIPTION OF EMBODIMENTS

Figure 1:
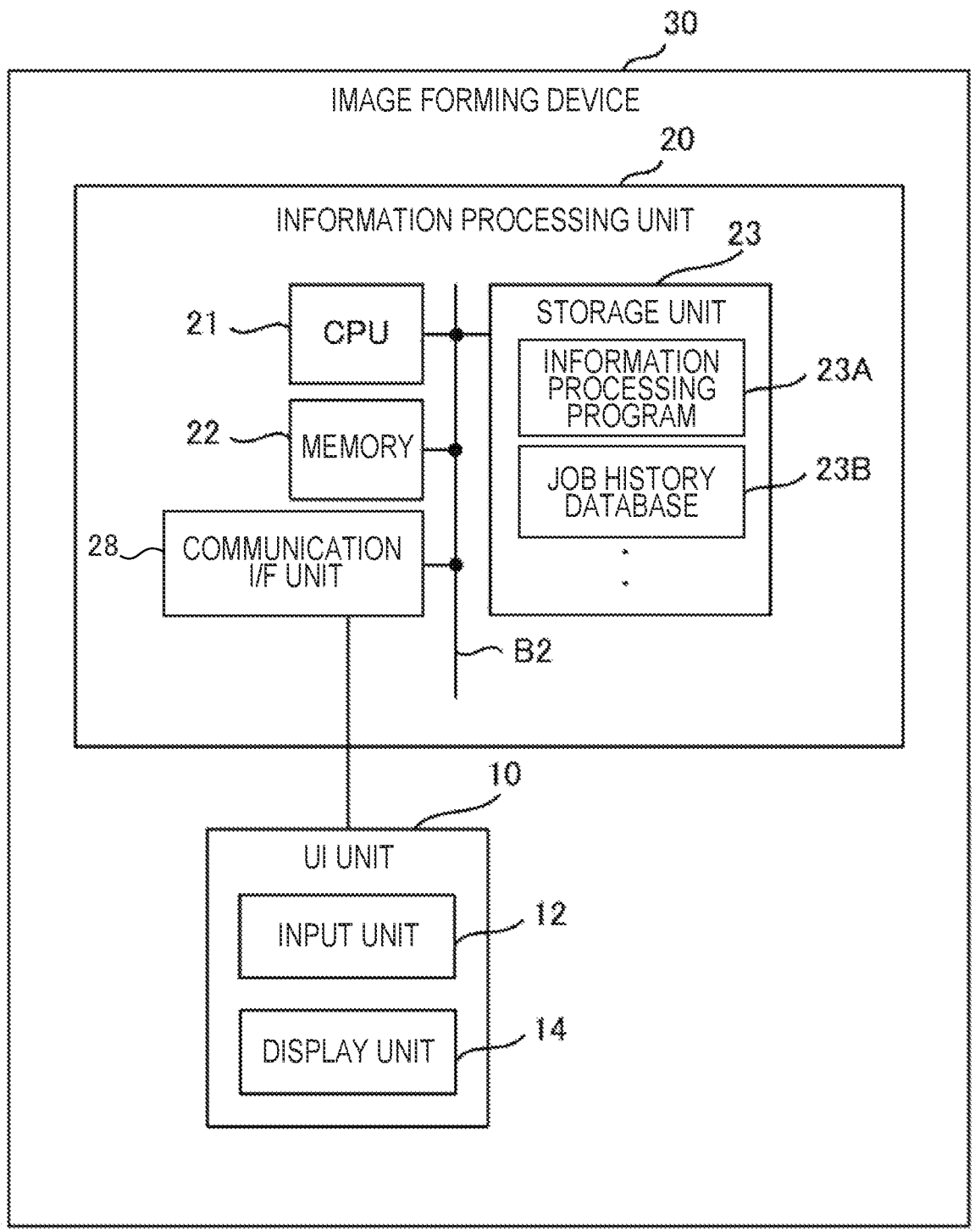
FIG. 1 is a schematic diagram illustrating an example of a hardware configuration of an image forming device according to an embodiment.

Hereinafter, examples of the embodiments of the disclosure will be described with reference to the drawings. In the drawings, the same or equivalent components and portions are denoted by the same reference numerals. Dimensional ratios in the drawings are exaggerated for convenience of description, and may be different from actual ratios.

A hardware configuration of an image forming device 30 according to the present embodiment will be described with reference to FIG. 1. In the present embodiment, a digital multifunction peripheral having an image printing function, an image reading function, an image transmission function, and the like is applied as the image forming device 30. However, an image forming device having one or two of these functions may be applied as the image forming device 30.

As illustrated in FIG. 1, the image forming device 30 includes a user interface (UI) unit 10 and an information processing unit 20. The UI unit 10 and the information processing unit 20 may be configured separately from the image forming device 30. The image forming device 30 according to the present embodiment is provided with an image forming unit, a sheet feeding unit that supplies a recording sheet, and the like as main components, but description thereof is omitted here in order to avoid complication.

Next, a hardware configuration of the UI unit 10 according to the present embodiment will be described. The UI unit 10 according to the present embodiment includes an input unit 12 and a display unit 14.

The input unit 12 includes a pointing device such as a mouse and a keyboard, and is used to receive various types of input information.

The display unit 14 is, for example, a liquid crystal display, and displays various types of information. The display unit 14 may function as the input unit 12 by adopting a touch panel system.

Next, a hardware configuration of the information processing unit 20 according to the present embodiment will be described. In the present embodiment, a personal computer is applied as the information processing unit 20. However, any information processing device such as a server computer may be applied as the information processing unit 20. The information processing unit 20 according to the present embodiment includes a CPU 21, a memory 22 as a temporary storage area, a nonvolatile storage unit 23, and a communication I/F unit 28. The respective components are coupled to each other via a bus B2.

The storage unit 23 is implemented by a storage device such as an HDD, an SSD, or a flash memory. The storage unit 23 as a storage medium stores an information processing program 23A. The CPU 21 reads the information processing program 23A from the storage unit 23, develops the information processing program 23A in the memory 22, and sequentially executes processes included in the information processing program 23A. The storage unit 23 stores various types of databases such as a job history database 23B. Details of this database will be described later.

The communication I/F unit 28 is an interface for the information processing unit 20 to communicate with the UI unit 10. For the communication, for example, a wired communication standard such as Ethernet (registered trademark) or FDDI is used.

Next, the job history database 23B according to the present embodiment will be described with reference to FIG. 2. The job history database 23B illustrated in FIG. 2 stores job history information that is information related to a history of a job instructed to be executed. In FIG. 2, each row represents the job history information. Each piece of the job history information is associated with each piece of information of a function, a setting, an execution instruction reception date and time, presence or absence of a retaining instruction, and presence or absence of a job discontinuation.

The above function is information indicating a function applied when the job is executed. In the present embodiment, the image printing function, the image reading function, and the image transmission function are applied as the above functions. The above setting is information indicating a setting of a corresponding function. In the present embodiment, color or monochrome print setting, double-sided or single-sided print setting, number of copies setting, and magnification setting are applied as the above settings. However, as the above setting, a margin size setting may be applied, or a single or a combination of a plurality of these settings may be applied. The execution instruction reception date and time is information indicating the date and time when the job execution instruction is received in the corresponding setting. The presence or absence of the retaining instruction is information indicating whether a retaining instruction, which is an instruction to retain an operator associated with the corresponding setting without erasing the operator from the display unit 14, has been received. The presence or absence of the job discontinuation is information indicating whether the job received at the corresponding execution instruction reception date and time has been discontinued.

The example illustrated in FIG. 2 represents that the image printing function is executed with the color print setting and the double-sided print setting at 15:00 on Jan. 6, 2021. It represents that the retaining instruction is received at this time and the job is not discontinued.

Figure 3:
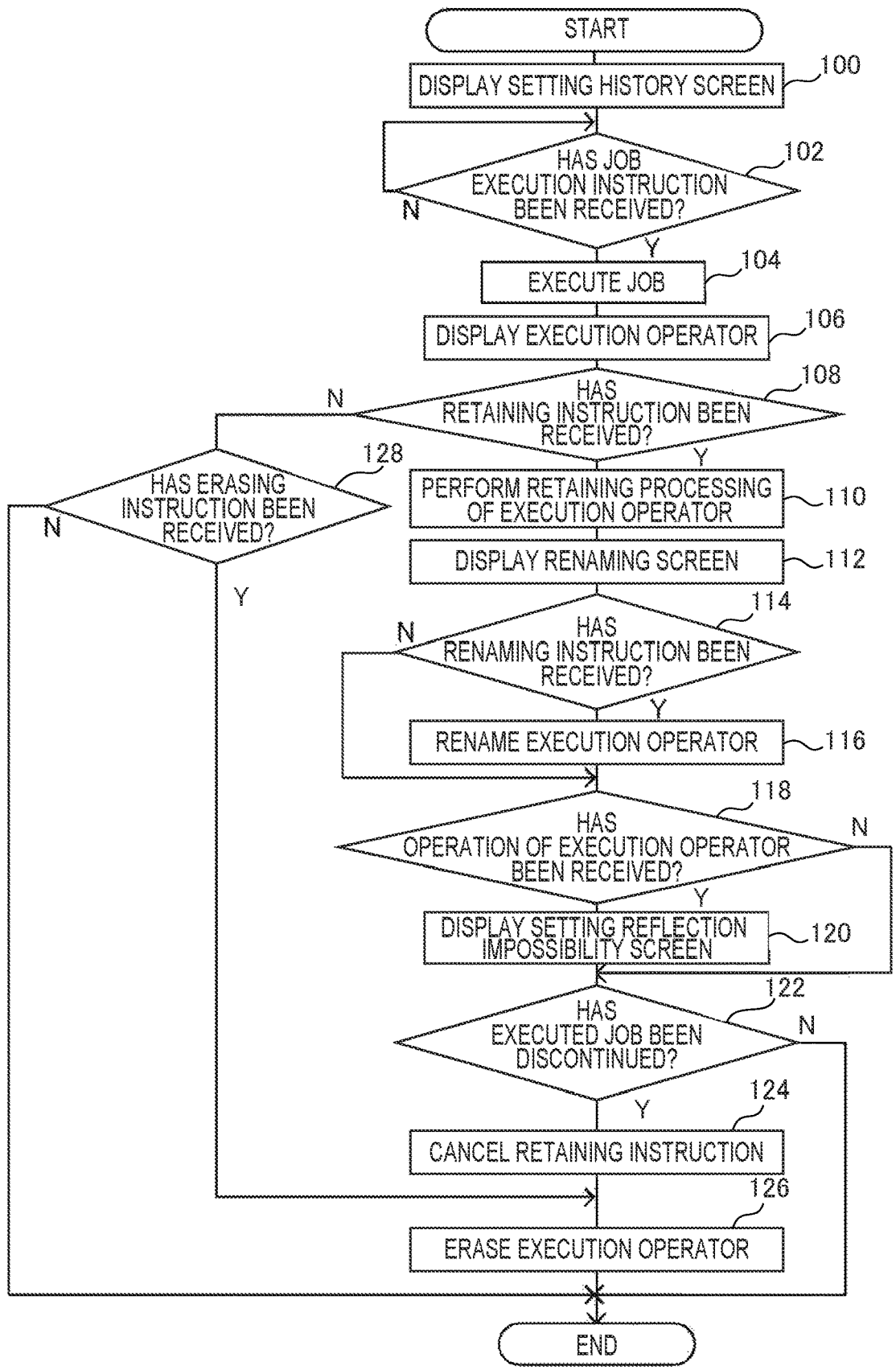
FIG. 3 is a flowchart illustrating an example of information processing according to a first embodiment.

Next, an action of the information processing unit 20 according to the present embodiment will be described with reference to FIG. 3. In a case in which a user instructs the information processing unit 20 to execute information processing via the input unit 12, the CPU 21 executes the information processing program 23A to execute the information processing illustrated in FIG. 3.

In step 100, the CPU 21 reads the job history database 23B, and displays a setting history screen conforming to a predetermined format on the display unit 14.

Figure 4:
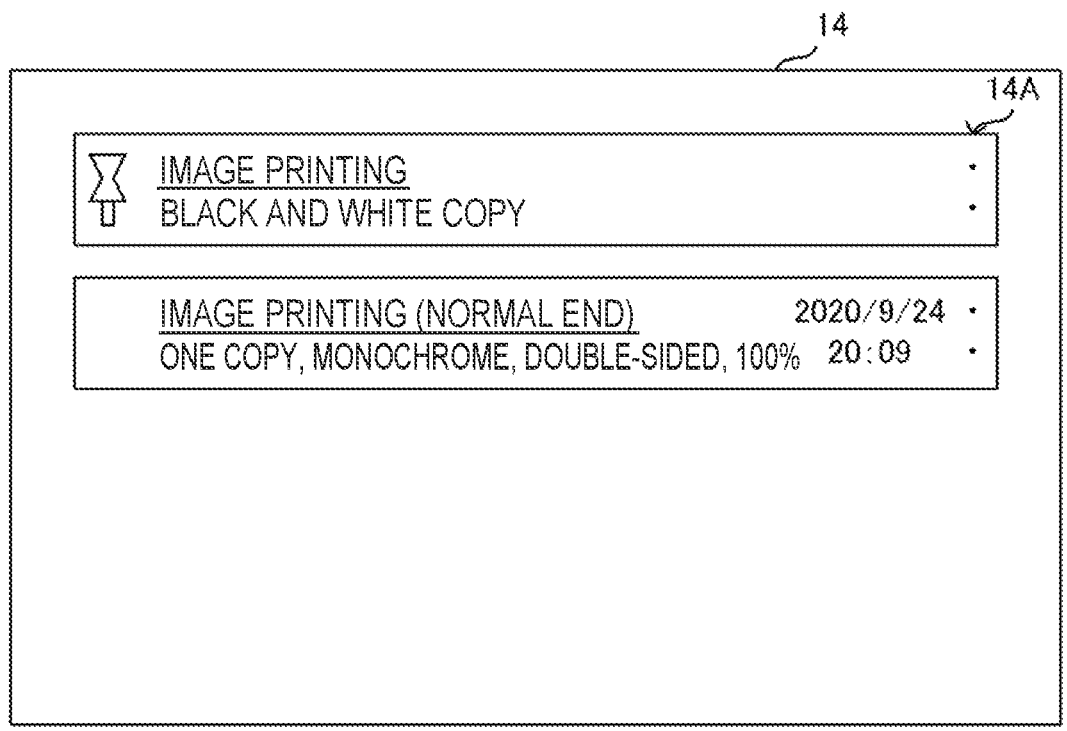
FIG. 4 is a schematic diagram illustrating an example of a setting history screen before a job according to the embodiment is executed.

As illustrated in FIG. 4, on the setting history screen according to the present embodiment, an operator for which a retaining instruction has been given (hereinafter, simply referred to as a "retaining instruction operator") and an operator associated with a setting of a job that has been normally ended without discontinuation (hereinafter, simply referred to as a "normal end operator") are displayed. A selection button 14A to be described later is displayed on each operator. In the example illustrated in FIG. 4, an operator named "black and white copy" is displayed as the retaining instruction operator. An image representing a pin is also displayed on the retaining instruction operator. In the example illustrated in FIG. 4, an operator associated with a setting of a job for which the execution instruction has been received at 20:09 on Sep. 24, 2020, that is, a setting for performing image printing of one copy at a magnification of 100% in the monochrome printing and the double-sided printing is displayed as the normal end operator.

In the present embodiment, a form is applied in which the retaining instruction operator is displayed above the normal end operator, in other words, at a top on the setting history screen. However, the retaining instruction operator may be displayed below the normal end operator, in other words, at a bottom of the setting history screen.

The CPU 21 may not display a setting (for example, a telephone number or the like) determined by the user in advance on the setting history screen.

In step 102, the CPU 21 waits until a job execution instruction is received via the communication I/F unit 28. In the present embodiment, a form is applied in which the execution instruction is received from a screen other than the setting history screen displayed on the display unit 14 via the input unit 12.

In the present embodiment, a form is applied in which the CPU 21 receives the job execution instruction after displaying the setting history screen on the display unit 14. However, the setting history screen may be displayed on the display unit 14 after the CPU 21 receives the job execution instruction.

In step 104, the CPU 21 executes the job (hereinafter, referred to as an "executed job") instructed to be executed in step 102.

Figure 5:
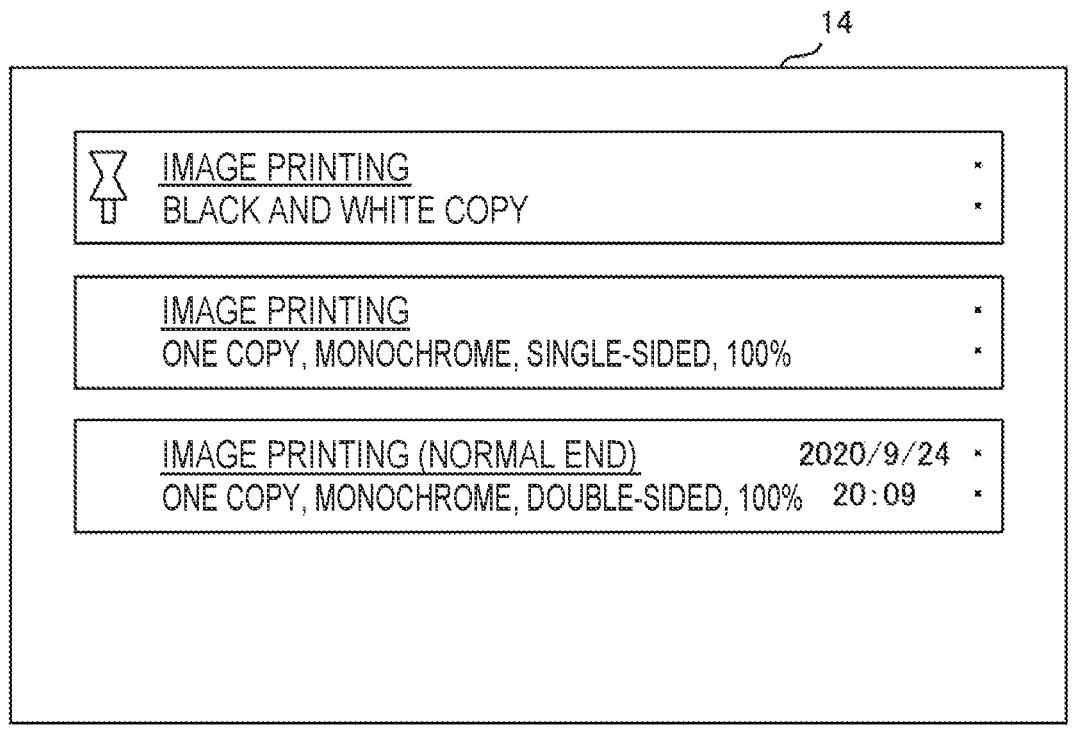
FIG. 5 is a schematic diagram illustrating an example of a setting history screen on which an execution operator according to the embodiment is displayed.

In step 106, the CPU 21 displays an operator (hereinafter, referred to as an "execution operator") associated with a setting of the executed job on the setting history screen. Therefore, in step 106, the retaining instruction operator, the normal end operator, and the execution operator are displayed on the setting history screen. In the example illustrated in FIG. 5, an operator associated with a setting of performing image printing of one copy at a magnification of 100% in monochrome and single-sided printing is displayed as the execution operator. In the present embodiment, a form is applied in which the execution operator is displayed between the retaining instruction operator and the normal end operator. However, the execution operator may be displayed at the top or the bottom of the setting history screen. In other words, an order of displaying the execution operator, the retaining instruction operator, and the normal end operator can be changed as appropriate.

Figure 6:
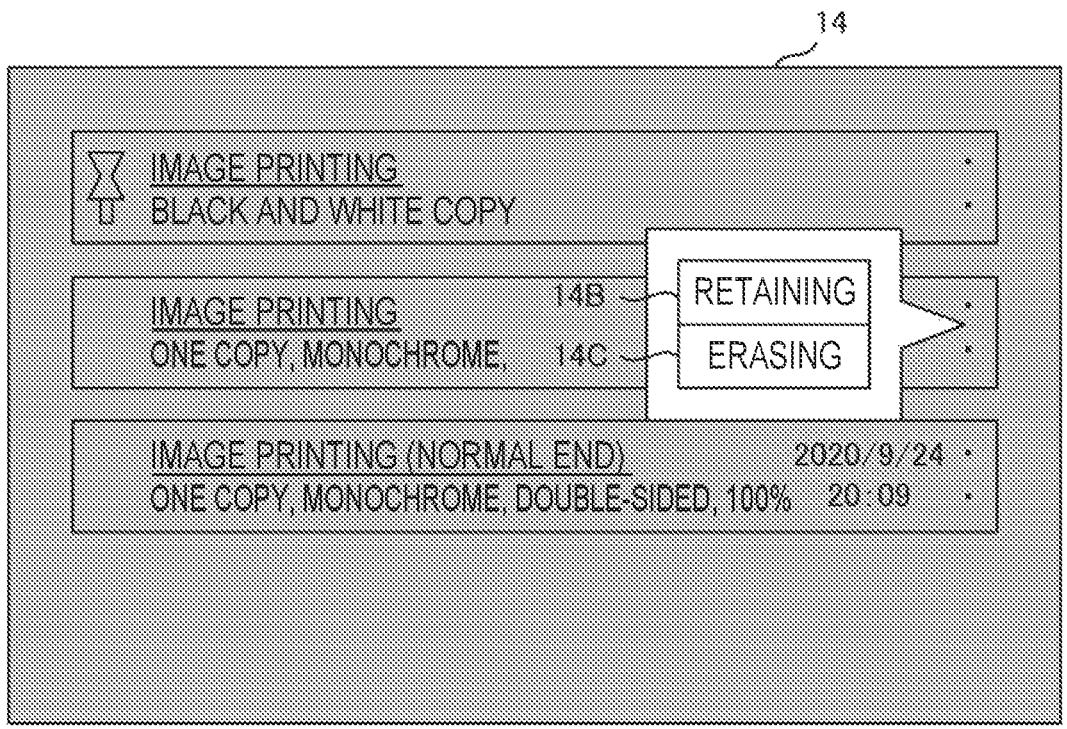
FIG. 6 is a schematic diagram illustrating an example of a setting history screen after a selection button of the execution operator according to the embodiment is selected.

In step 108, the CPU 21 determines whether a retaining instruction for the execution operator has been received. For example, in FIG. 5, when the selection button 14A of the execution operator of "image printing (one copy, monochrome, single-sided, 100%)" is selected, a retaining button 14B and an erasing button 14C are displayed as illustrated in FIG. 6. In a case in which an affirmative determination is made in the processing of step 108, in other words, in a case in which the retaining button 14B of the execution operator is selected via the input unit 12, the CPU 21 proceeds to step 110.

Figure 7:
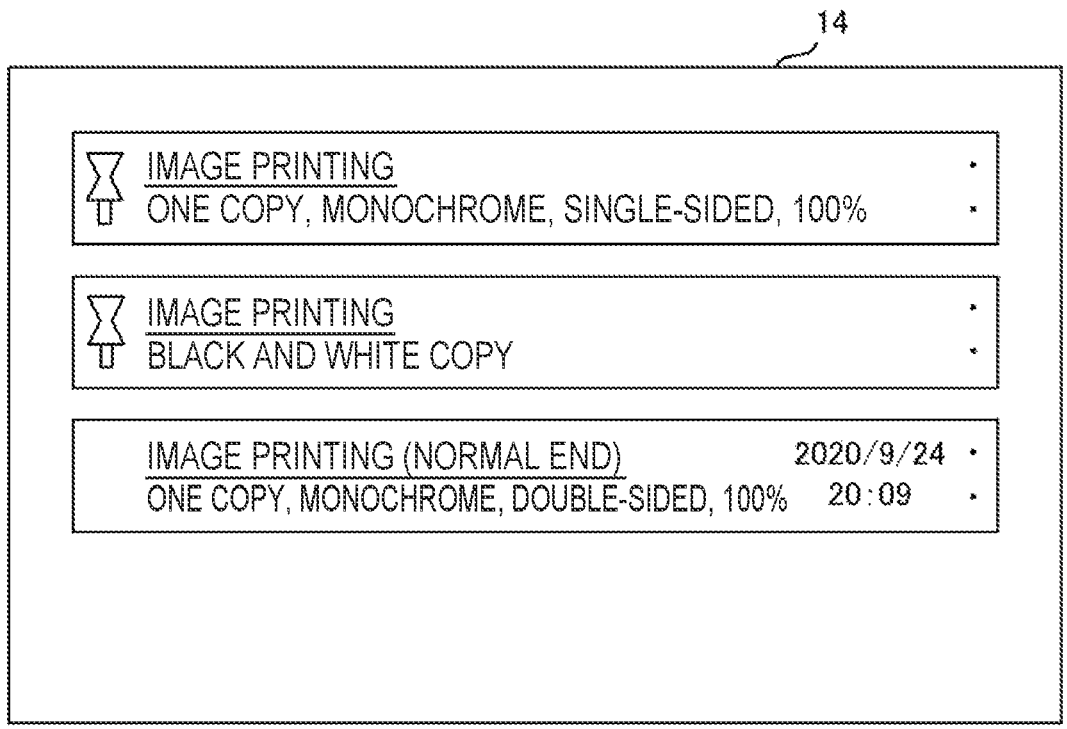
FIG. 7 is a schematic diagram illustrating an example of a setting history screen after retaining processing is executed on the execution operator according to the embodiment.

In step 110, even in a case in which the number of operators displayed on the display unit 14 exceeds a threshold with respect to the execution operator, the CPU 21 executes retaining processing which is processing of retaining without erasing. In this case, as illustrated in FIG. 7, the execution operator is displayed as the retaining instruction operator on the top together with the image representing the pin.

In the present embodiment, an order of operators associated with a setting of a job having a new execution instruction reception date and time is applied as a display order of operators of the same type. For example, among the retaining instruction operators, an operator associated with a setting of a job having a latest execution instruction reception date and time is displayed at the top, and an operator associated with a setting of an oldest job is displayed at the bottom. However, an order of a number of times of receiving operations from the setting history screen or an order of names of the operators in the Japanese syllabary order or the like may be applied as an arrangement order of the operators of the same type.

In step 112, the CPU 21 displays a renaming screen conforming to a predetermined format on the display unit 14.

Figure 8:
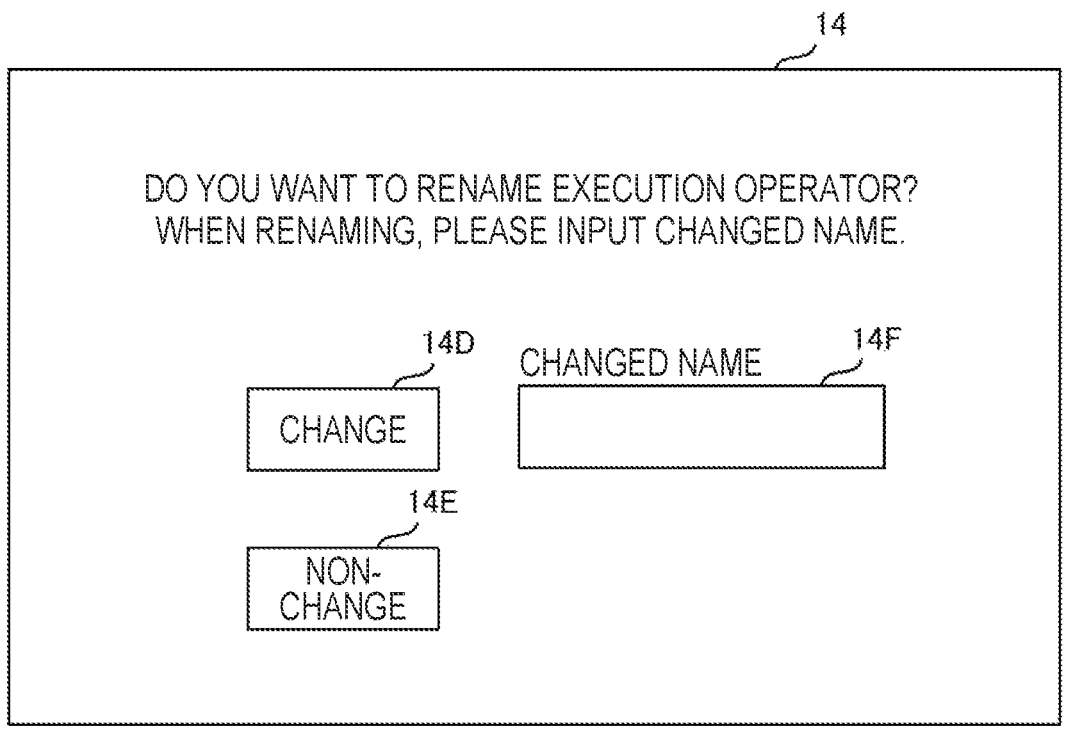
FIG. 8 is a schematic diagram illustrating an example of a renaming screen according to the embodiment.

As illustrated in FIG. 8, on the renaming screen according to the present embodiment, a message prompting selection as to whether to rename the execution operator and input of the changed name is displayed. In a case of renaming the execution operator, the user selects a change button 14D, and inputs the name of the changed execution operator to a changed name input field 14F via the input unit 12. In this regard, in a case in which the user does not rename the execution operator, a non-change button 14E is selected via the input unit 12.

In step 114, the CPU 21 determines whether an instruction to rename the execution operator has been received. In a case in which an affirmative determination is made in the processing of step 114, in other words, in a case in which the change button 14D is selected on the renaming screen via the input unit 12, the CPU 21 proceeds to step 116. In this regard, in a case in which a negative determination is made in the processing of step 114, in other words, in a case in which the non-change button 14E is selected on the renaming screen via the input unit 12, the CPU 21 proceeds to step 118.

Figure 9:
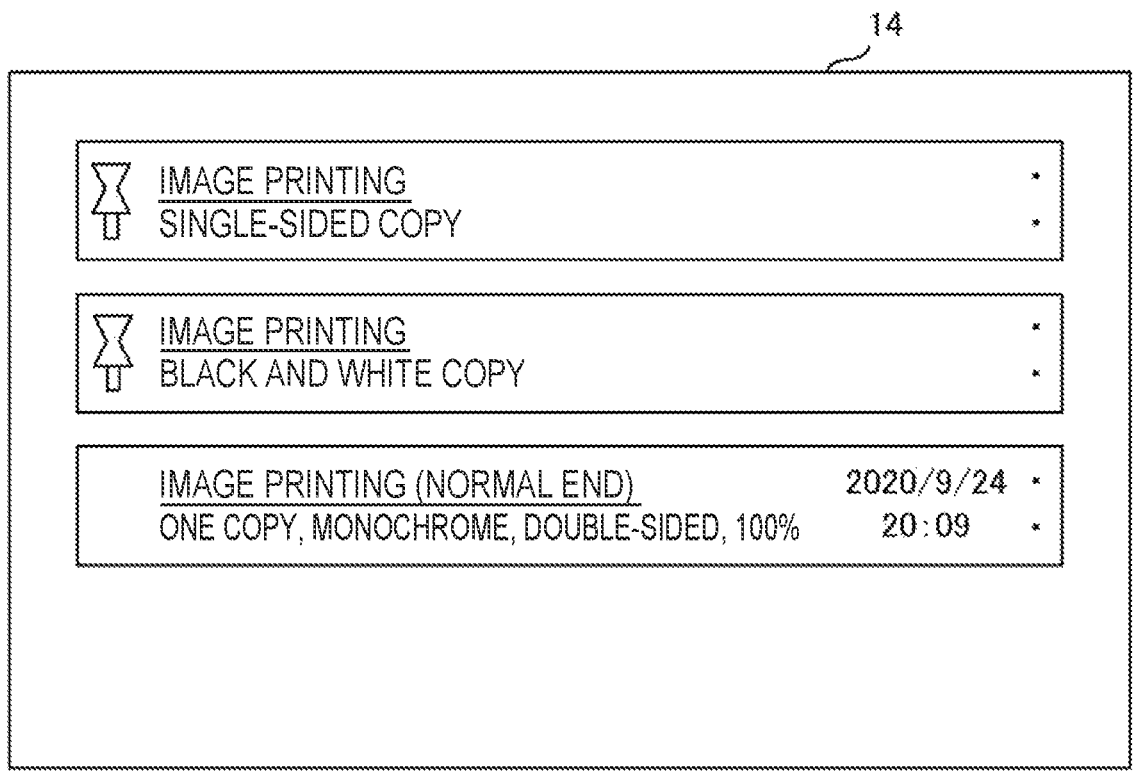
FIG. 9 is a schematic diagram illustrating an example of a setting history screen on which an execution operator after renaming according to the embodiment is displayed.

In step 116, the CPU 21 changes the name of the execution operator to the name input in the changed name input field 14F on the renaming screen. In the example illustrated in FIG. 9, the name of the execution operator is changed to "single-sided copy".

In step 118, the CPU 21 determines whether an operation of the execution operator has been received. Specifically, the CPU 21 determines whether an instruction to apply the setting associated with the execution operator to another job has been received from the setting history screen via the input unit 12. In a case in which an affirmative determination is made in the processing of step 118, the CPU 21 proceeds to step 120, and in a case in which a negative determination is made, the CPU 21 proceeds to step 122.

In step 120, the CPU 21 displays a setting reflection impossibility screen conforming to a predetermined format on the display unit 14, and then proceeds to step 122 without applying the setting associated with the execution operator to the another job.

Figure 10:
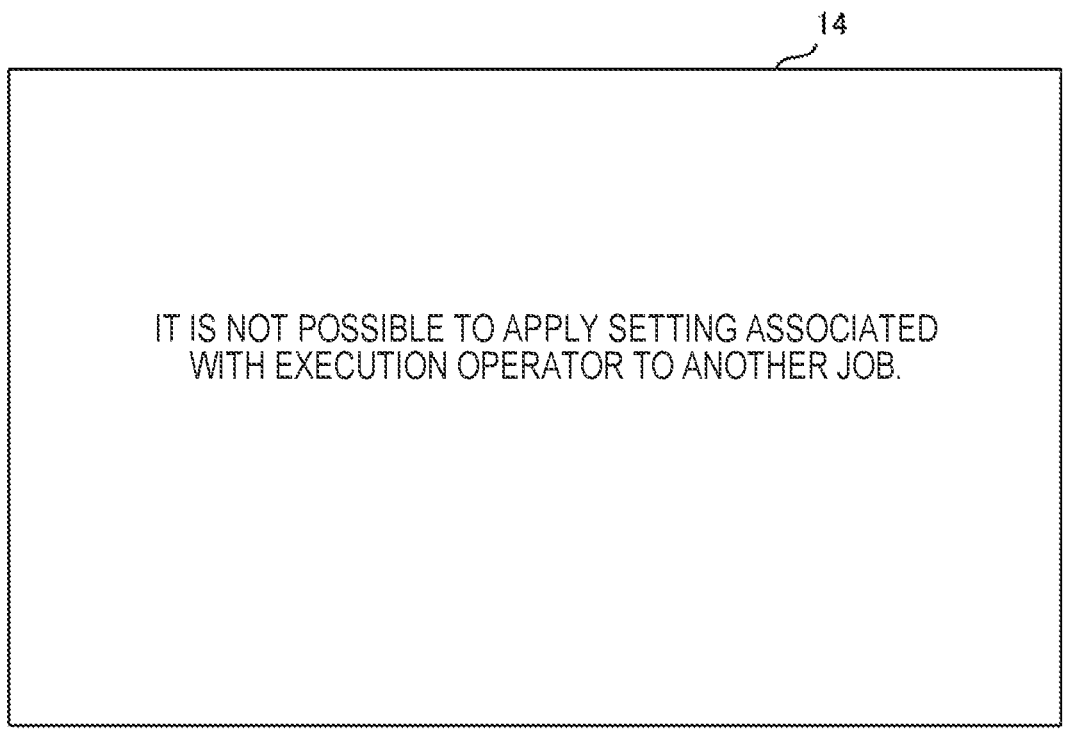
FIG. 10 is a schematic diagram illustrating an example of a setting reflection impossibility screen according to the embodiment.

As illustrated in FIG. 10, on the setting reflection impossibility screen according to the present embodiment, a message representing that the setting associated with the execution operator is not applied to the another job is displayed.

In a case in which the CPU 21 receives an instruction to apply the same setting as the setting associated with the execution operator to another job via the input unit 12 from a screen other than the setting history screen, a negative determination is made in the processing of step 118. In this case, the CPU 21 does not display the setting reflection impossibility screen on the display unit 14, and applies the same setting as the setting associated with the execution operator to the another job.

In step 122, the CPU 21 determines whether the executed job has been discontinued. In a case in which an affirmative determination is made in the processing of step 122, the CPU 21 proceeds to step 124, and in a case in which a negative determination is made, the present information processing is ended.

In step 124, the CPU 21 cancels the retaining instruction for the executed job.

In step 126, the CPU 21 erases the execution operator from the setting history screen, and ends the present information processing. In other words, the CPU 21 displays only the retaining instruction operator and the normal end operator on the setting history screen, and ends the present information processing.

Returning to step 108, in a case in which a negative determination is made, in other words, in a case in which the erasing button 14C of the execution operator is selected or in a case in which the selection button 14A of the execution operator is not selected, the CPU 21 proceeds to step 128. In step 128, the CPU 21 determines whether an erasing instruction of the execution operator has been received. In a case in which an affirmative determination is made in the processing of step 128, in other words, in a case in which the erasing button 14C of the execution operator is selected via the input unit 12, the CPU 21 proceeds to step 126. In this regard, in a case in which a negative determination is made in the processing of step 128, in other words, in a case in which the selection button 14A of the execution operator is not selected via the input unit 12, the CPU 21 ends the present information processing.

[Second Embodiment] A second embodiment is different from the first embodiment in that an execution operator is displayed on a setting history screen even in a case in which an executed job for which a retaining instruction has been received is discontinued. In other words, the second embodiment is different from the first embodiment in that the CPU 21 displays a retaining instruction operator, a normal end operator, and an operator (hereinafter, referred to as a "discontinued operator") associated with a setting of the discontinued job on the setting history screen. Details will be described below.

A hardware configuration of the image forming device 30 according to the present embodiment is the same as the configuration according to the first embodiment (see FIGS. 1 and 2), and thus the description thereof is omitted here.

Next, the action of the information processing unit 20 according to the present embodiment will be described with reference to FIG. 11. Processing of steps 200 to 222 and processing of steps 234 to 236 of information processing illustrated in FIG. 11 are the same as the processing of steps 100 to 122 and the processing of steps 126 to 128 of the information processing illustrated in FIG. 3, and thus, description thereof is omitted.

Figure 11:
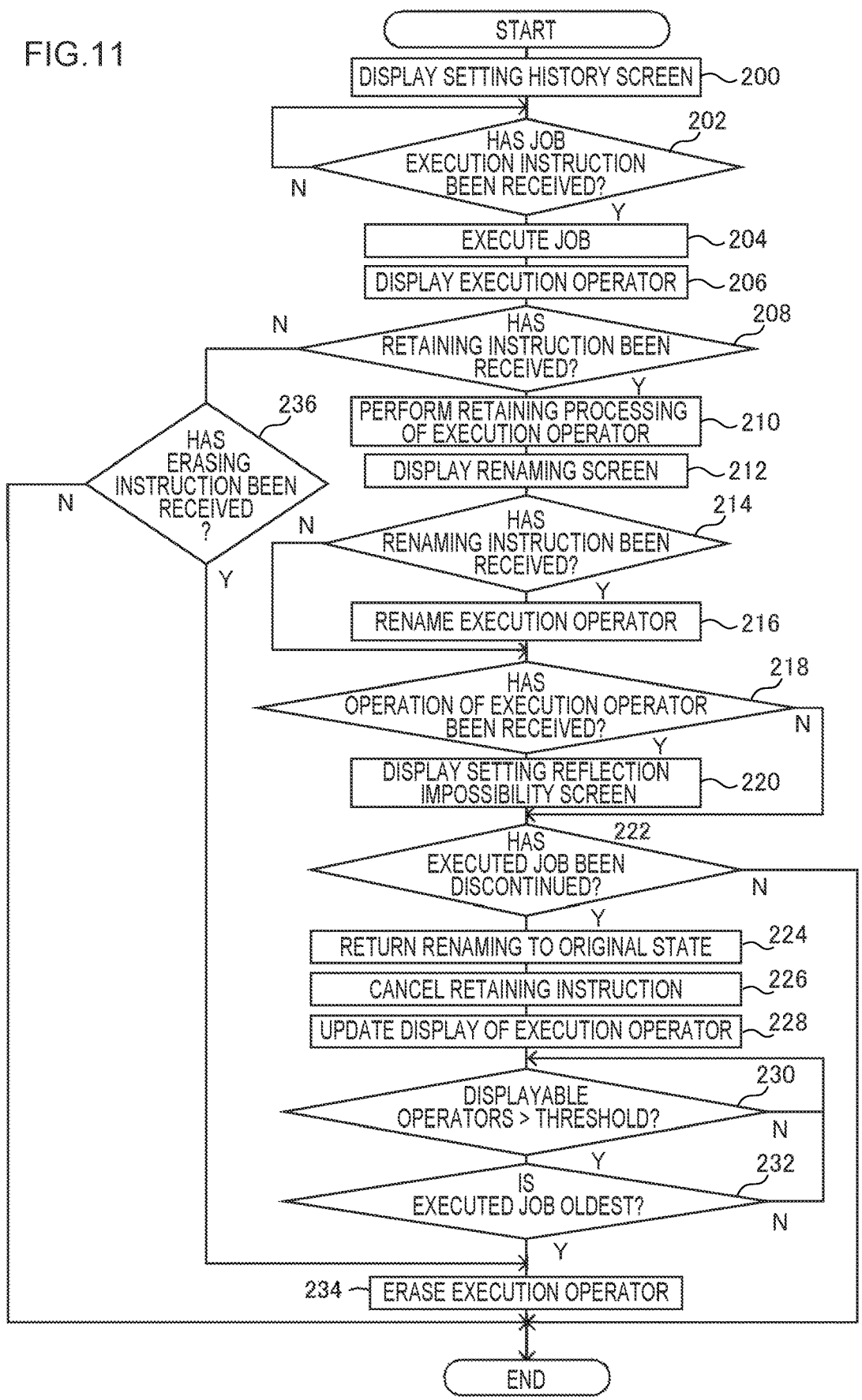
FIG. 11 is a flowchart illustrating an example of information processing according to a second embodiment.

In step 224 of FIG. 11, the CPU 21 returns the name of the execution operator changed in the processing of step 216 to the original state. Specifically, the CPU 21 returns the name of the execution operator changed in the processing of step 216 to the name when displayed on the setting history screen in the processing of step 206.

In step 226, the CPU 21 cancels the retaining instruction for the executed job.

In step 228, the CPU 21 updates the display of the execution operator on the setting history screen.

Figure 12:
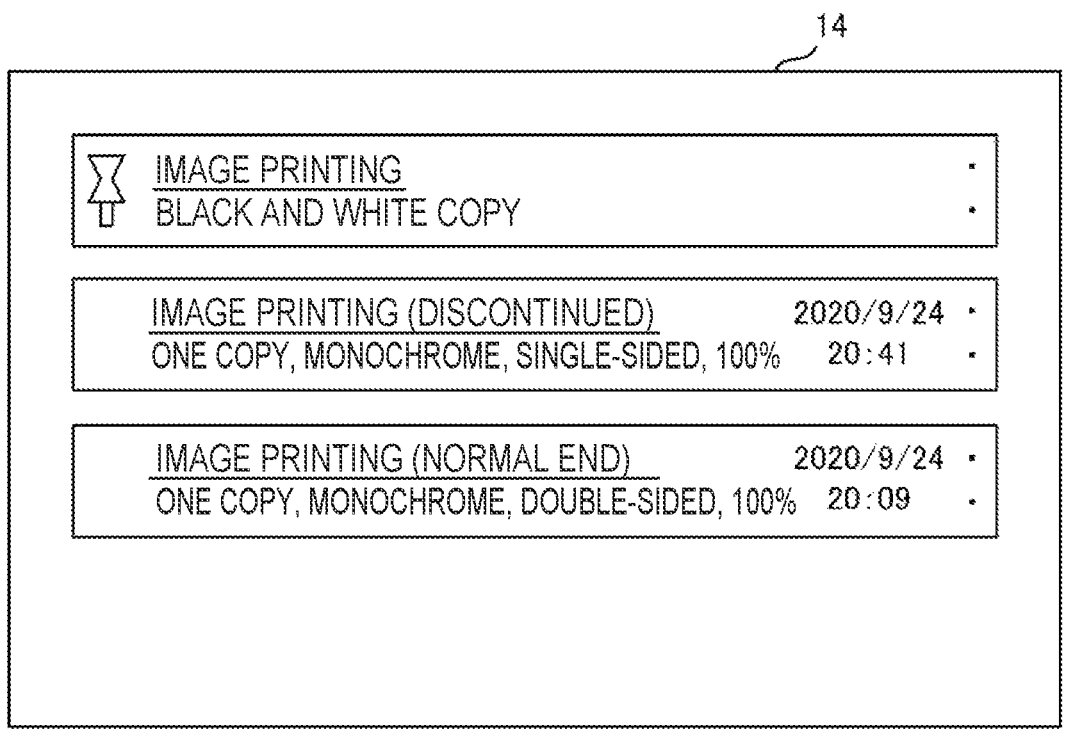
FIG. 12 is a schematic diagram illustrating an example of a setting history screen after updating an execution operator according to the second embodiment.

In the example illustrated in FIG. 12, the image representing the pin displayed together with the execution operator is erased, and the execution operator is displayed as the discontinued operator. The name of the execution operator has been changed to a name representing a setting of a job of which execution has been discontinued although an execution instruction has been received at 20:41 on Sep. 24, 2020, and which is a setting to perform image printing of one copy at a magnification of 100% in monochrome printing and single-sided printing.

In a case in which a cause of discontinuation of the executed job is the same as a predetermined cause, the CPU 21 may not cancel the retaining instruction for the executed job. For example, in a case in which the cause of the discontinuation of the executed job is a cause unrelated to the setting of the executed job such as a paper jam in the sheet feeding unit of the image forming device 30, the CPU 21 may not cancel the retaining instruction for the executed job.

In step 230, the CPU 21 waits until the number of operators displayed on the setting history screen exceeds a threshold which is the number of operators displayable on the setting history screen.

In a case in which the user determines the number of discontinued operators that are displayable on the setting history screen, in step 230, the CPU 21 may wait until the number of discontinued operators displayed exceeds the number of discontinued operators that are displayable.

In step 232, the CPU 21 reads the execution instruction reception date and time from the job history database 23B, and determines whether the execution instruction reception date and time corresponding to the executed job is the oldest among the execution reception dates and times of all the jobs associated with the operators displayed on the display unit 14. In a case in which an affirmative determination is made in the processing of step 232, the CPU 21 proceeds to step 234, and in a case in which a negative determination is made, the CPU 21 returns to step 230.

In step 232, the CPU 21 may determine whether the date and time when the retaining instruction for the executed job is canceled is the oldest as compared with the execution reception dates and times of the jobs associated with all the operators displayed on the display unit 14.

The CPU 21 may display the execution operator on the setting history screen only in a case in which the number of operators displayed on the display unit 14 does not exceed the threshold. In other words, in a case in which an affirmative determination is made in the processing of step 230, the CPU 21 may proceed to step 234.

In a case in which the CPU 21 cancels the retaining instruction for the executed job, the execution operator may be displayed on the setting history screen only for a predetermined number of days (for example, one week) from the execution instruction reception date and time. Specifically, the CPU 21 executes processing of determining whether the predetermined number of days has elapsed from the execution instruction reception date and time corresponding to the executed job, instead of the processing of step 232. The CPU 21 proceeds to step 234 in a case in which an affirmative determination is made in the above processing, and returns to step 230 in a case in which a negative determination is made.

[Third Embodiment] A third embodiment is different from the second embodiment in that, in a case in which an executed job for which a retaining instruction has been received is discontinued, selection as to whether to cancel the retaining instruction is received. Details will be described below.

A hardware configuration of the image forming device 30 according to the present embodiment is the same as the configuration according to the first embodiment (see FIGS. 1 and 2), and thus the description thereof is omitted here.

Next, the action of the information processing unit 20 according to the present embodiment will be described with reference to FIG. 13. Processing of steps 300 to 324 and processing of steps 332 to 342 of information processing illustrated in FIG. 13 are the same as the processing of steps 200 to 224 and the processing of steps 226 to 236 of the information processing illustrated in FIG. 11, and thus, description thereof is omitted.

Figure 13:
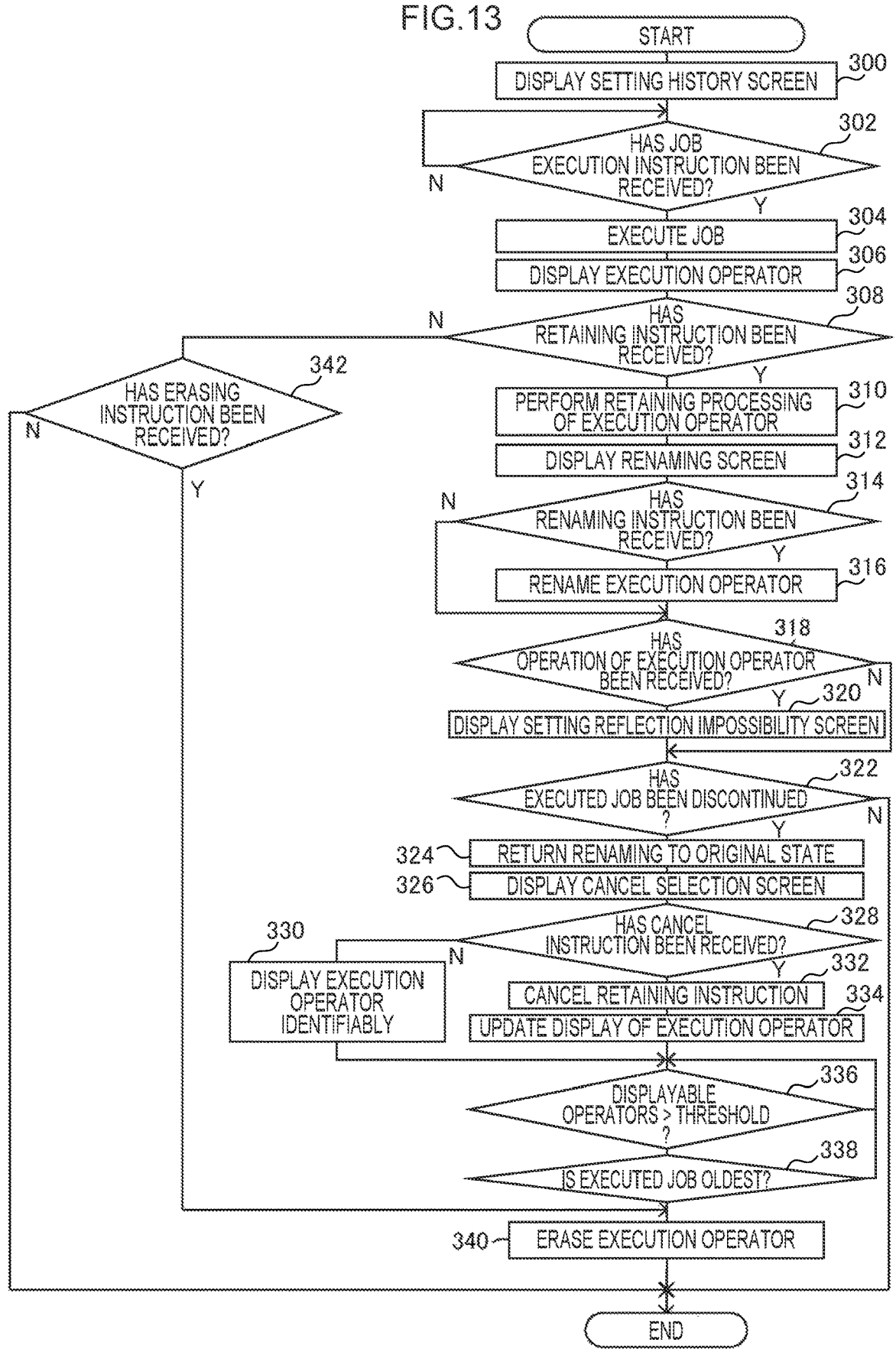
FIG. 13 is a flowchart illustrating an example of information processing according to a third embodiment.

In step 326 of FIG. 13, the CPU 21 displays a cancel selection screen conforming to a predetermined format on the display unit 14.

Figure 14:
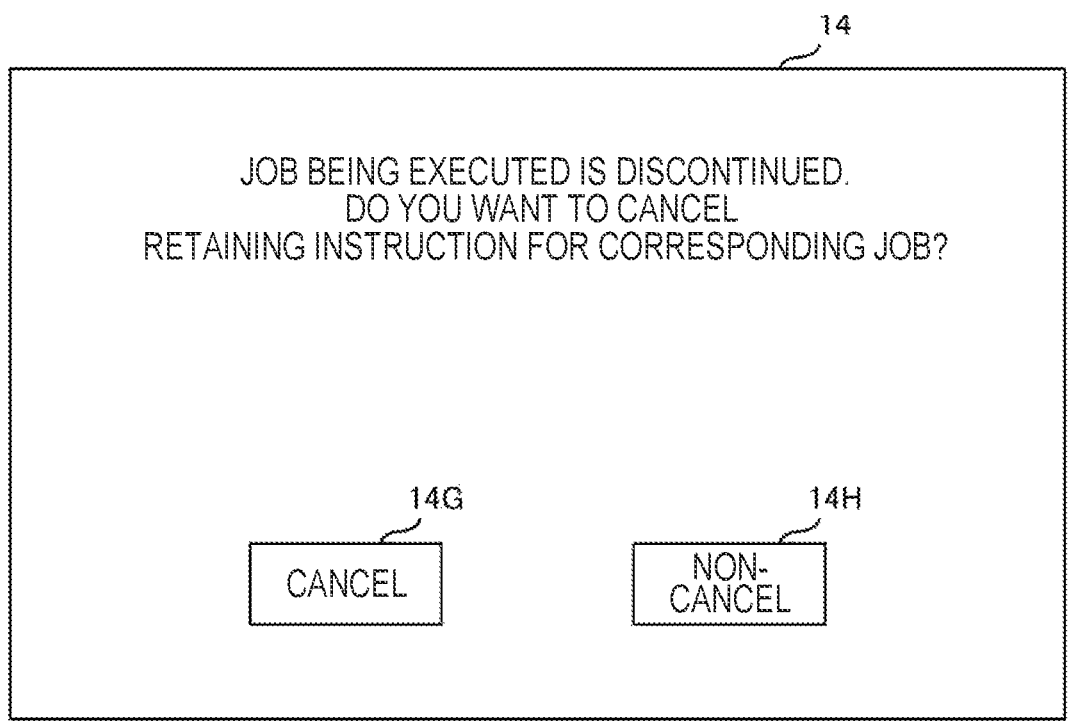
FIG. 14 is a schematic diagram illustrating an example of a cancel selection screen according to the third embodiment.

As illustrated in FIG. 14, on the cancel selection screen according to the present embodiment, a message prompting selection as to whether to cancel the retaining instruction for the executed job is displayed. In a case in which the user cancels the retaining instruction, the user selects a cancel button 14G via the input unit 12. In this regard, in a case in which the user does not cancel the retaining instruction, a non-cancel button 14H is selected via the input unit 12.

On the cancel selection screen, a message prompting whether to erase the execution operator from the setting history screen may be displayed in addition to whether to cancel the retaining instruction for the executed job. As a result, the user can also select whether to erase the execution operator from the setting history screen.

In step 328, the CPU 21 determines whether the selection to cancel the retaining instruction has been received. In a case in which the CPU 21 makes an affirmative determination in the processing of step 328, in other words, in a case in which the cancel button 14G is selected via the input unit 12 on the cancel selection screen, the CPU 21 proceeds to step 332. In this regard, in a case in which a negative determination is made in the processing of step 328, in other words, in a case in which the non-cancel button 14H is selected on the cancel selection screen via the input unit 12, the CPU 21 proceeds to step 330.

Figure 15:
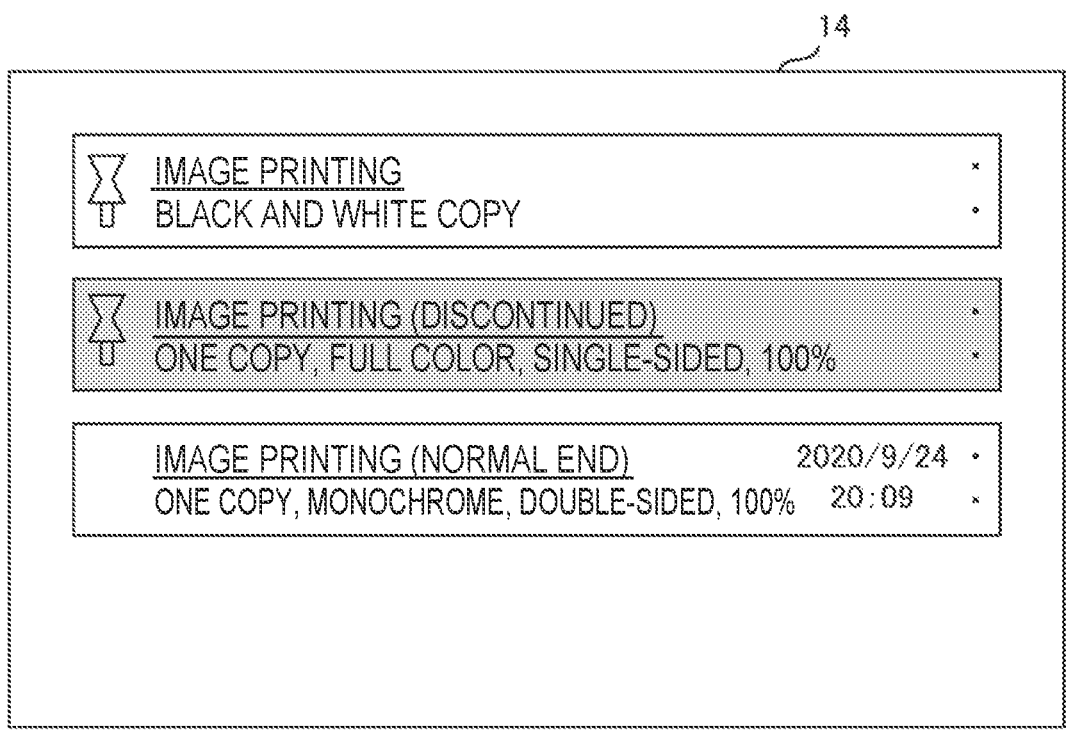
FIG. 15 is a schematic diagram illustrating an example of a setting history screen on which an execution operator according to the third embodiment is identifiably displayed.

In step 330, the CPU 21 displays the execution operator on the setting history screen identifiably from another operator. In the example illustrated in FIG. 15, only the execution operator is displayed in a grayed-out state together with the image representing the pin. In step 330, the CPU 21 may display the execution operator together with at least one of a message representing that the corresponding job has been discontinued and the date and time when the corresponding job has been discontinued.

The CPU 21 may receive the selection as to whether to cancel the retaining instruction for the executed job before the executed job is discontinued. Specifically, the CPU 21 may display the cancel selection screen to an administrator or the like of the image forming device 30 before executing the executed job, and execute the processing of step 328 according to a result selected on the screen.

Although the embodiments have been described above, the technical scope of the disclosure is not limited to the scope described in the above embodiments. Various changes or improvements can be made to the above embodiments without departing from the gist of the invention, and a form in which the changes or improvements are made is also included in the technical scope of the disclosure.

The above-described embodiments do not limit the invention according to the claims (claims), and all combinations of features described in the embodiments are not necessarily essential to the solution of the invention. The above-described embodiments include inventions at various stages, and various inventions are extracted by a combination of a plurality of disclosed components. Even when some components are erased from all the components described in the embodiments, a configuration in which some components are erased can be extracted as an invention as long as an effect can be obtained.

In the above embodiments, the processor refers to a processor in a broad sense, and includes a general-purpose processor (for example, CPU: Central Processing Unit and the like) or a dedicated processor (for example, GPU: Graphics Processing Unit, ASIC: Application Specific Integrated Circuit, FPGA: Field Programmable Gate Array, Programmable Logic Device, and the like).

The operation of the processor in the above embodiments may be performed not only by one processor but also by cooperation of a plurality of processors existing at physically separated positions. An order of each operation of the processor is not limited to the order described in the above embodiments, and may be changed, as appropriate.

In the present embodiment, the form in which the information processing program 23A is installed in the storage unit 23 has been described, but the disclosure is not limited thereto. The information processing program 23A according to the present embodiment may be provided in a form of being recorded in a computer-readable storage medium. For example, the information processing program 23A according to the present embodiment may be provided in a form of being recorded in an optical disk such as a compact disc (CD)-ROM and a digital versatile disc (DVD)-ROM, or in a form of being recorded in a semiconductor memory such as a universal serial bus (USB) memory or a memory card. The information processing program 23A according to the present embodiment may be acquired from an external device via the communication I/F unit 28.

In the above-described embodiments, a case in which information processing is implemented by a software configuration using a computer by executing a program has been described, but the disclosure is not limited thereto. The information processing may be implemented by a hardware configuration or a combination of a hardware configuration and a software configuration.

In addition, the configuration of the information processing unit 20 described in the above embodiments is an example, and it goes without saying that an unnecessary portion may be erased or a new portion may be added within a range not departing from the gist of the disclosure.

The flow of processing (see FIGS. 3, 11, and 13) of the information processing program described in the above embodiments is also an example, and it goes without saying that unnecessary steps may be erased, new steps may be added, or the processing order may be changed within a range not departing from the gist of the disclosure.

The disclosure of Japanese Patent Application No. 2021-027672 is incorporated herein by reference in its entirety.

All documents, patent applications, and technical standards described in this specification are incorporated herein by reference to the same extent as if each document, patent application, and technical standard were specifically and individually indicated to be incorporated by reference.

The invention claimed is:

1. An information processing device comprising:
a processor,
wherein the processor:
displays an operator associated with a setting of a job on a display unit;
receives a retaining instruction, which is an instruction to retain the operator associated with the setting of the job without erasing the operator from the display unit while the job is being executed; and
after receiving the retaining instruction, in a case in which the job that is being executed is discontinued, cancels the retaining instruction for the discontinued job.

2. The information processing device according to claim 1, wherein the processor displays an operator associated with a setting of the discontinued job on the display unit as a history of the setting of the job in a case in which the retaining instruction is canceled.

3. The information processing device according to claim 2, wherein the processor displays the operator associated with the setting of the discontinued job on the display unit until the operator becomes an oldest applied operator in the history and is erased from the history due to limitation of a number of operators displayable on the display unit in a case in which the retaining instruction is canceled.

4. The information processing device according to claim 1, wherein the processor:
receives a selection as to whether to cancel the retaining instruction in a case in which the job that is being executed is discontinued, and
cancels the retaining instruction for the discontinued job in a case in which a selection to cancel the retaining instruction is received.

5. The information processing device according to claim 4, wherein the processor displays the operator associated with the setting of the discontinued job on the display unit identifiably from another operator in a case in which selection not to cancel the retaining instruction is received.

6. The information processing device according to claim 1, wherein the processor does not apply the setting associated with the operator for which the retaining instruction has been given to another job even in a case in which the user operates the operator for which the retaining instruction has been given while a job based on the setting associated with the operator for which the retaining instruction has been given is being executed, even in a case in which the retaining instruction is received.

7. The information processing device according to claim 1, wherein the processor:
receives renaming of the operator associated with the setting of the job that is being executed in a case in which the retaining instruction is received while the job is being executed, and
returns, after the receipt of the renaming, in a case in which the job that is being executed is discontinued, the renaming for the discontinued job to an original state.

8. A non-transitory computer-readable storage medium storing an information processing program for causing a computer to execute a process, the process comprising:
displaying an operator associated with a setting of a job on a display unit;
receiving a retaining instruction, which is an instruction to retain the operator associated with the setting of the job without erasing the operator from the display unit while the job is being executed; and
canceling, after the receipt of the retaining instruction, in a case in which the job that is being executed is discontinued, the retaining instruction for the discontinued job.

* * * * *